(12) United States Patent
Yu et al.

(10) Patent No.: US 8,981,666 B2
(45) Date of Patent: Mar. 17, 2015

(54) LIGHT EMITTING ELEMENT DRIVING CIRCUIT

(75) Inventors: Bo Yu, Hangzhou (CN); Yuancheng Ren, Hangzhou (CN); Lei Du, Hangzhou (CN); Naixing Kuang, Hangzhou (CN); Zhijiang Yang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 862 days.

(21) Appl. No.: 13/177,420

(22) Filed: Jul. 6, 2011

(65) Prior Publication Data

US 2012/0049761 A1 Mar. 1, 2012

(30) Foreign Application Priority Data

Jul. 14, 2010 (CN) .......................... 2010 1 0229847

(51) Int. Cl.
*H05B 37/02* (2006.01)
*H05B 33/08* (2006.01)
*G09G 3/34* (2006.01)

(52) U.S. Cl.
CPC .......... *H05B 33/0827* (2013.01); *G09G 3/3406* (2013.01); *G09G 2330/08* (2013.01); *Y02B 20/341* (2013.01)
USPC ............................. 315/291; 315/307; 315/308

(58) Field of Classification Search
CPC ........... H02H 3/08; H02H 3/20; H05B 37/02; H05B 33/0848; H05B 33/0896; H05B 33/0806; H05B 37/036
USPC ............. 315/185 R, 194–199, 291, 307–308, 315/300, 302
See application file for complete search history.

(56) References Cited

U.S. PATENT DOCUMENTS 8,390,262 B2 * 3/2013 Chang et al. ................... 323/282
2009/0225020 A1 * 9/2009 Ran et al. ....................... 345/102
2011/0089858 A1 * 4/2011 Wang et al. .................... 315/294

* cited by examiner

*Primary Examiner* — Tuyet Thi Vo
*Assistant Examiner* — Henry Luong
(74) *Attorney, Agent, or Firm* — Perkins Coie LLP (57) ABSTRACT

The present disclosure discloses a light emitting element driving circuit. In one embodiment the light emitting element driving circuit may comprise a power conversion circuit and a current balancing circuit. In other embodiment the light emitting element driving circuit may further comprise other modules integrated and interacting with the power conversion circuit and the current balancing circuit, such as fault detection and protection circuits, status indication circuits and phase-shift PWM dimming circuits. In other embodiment, the present disclosure further discloses a current balancing circuit. In other embodiment, the present disclosure further discloses a fault detection and protection circuit. In still other embodiment, the present disclosure further discloses a phase-shift PWM dimming circuit.

19 Claims, 6 Drawing Sheets

LIGHT EMITTING ELEMENT DRIVING CIRCUIT

CROSS-REFERENCE TO RELATED APPLICATION(S)

This application claims priority to and the benefit of Chinese Patent Application No. 201010229847.9, filed Jul. 14, 2010, which is incorporated herein by reference in its entirety.

TECHNICAL FIELD

This disclosure relates generally to light emitting element driving circuits, and particularly relates to driving circuits for a plurality of parallel connected light emitting elements and display device comprising the same.

BACKGROUND

The statements in this section merely provide background information related to the present technology and may not constitute prior art.

Presently, light emitting diodes (LED) are more and more widely used in various electrical/electronic devices. For example, the LED is tending to gradually replace the traditional discharge lamp as the backlight source for liquid crystal display (LCD) devices.

For various application systems that utilize LEDs as backlight sources, it is better to have fault detection, fault protection and/or other functions to enhance system operation reliability. In addition, in application systems using a plurality of LED or LED strings for backlighting, it is desired that the light emitted by the plurality of LED or LED strings are uniform and consistent, which requires that currents flowing through each individual LED or LED string should tend to be balancing and matching. Meanwhile, in various applications, dimming for the LED/LED strings is also desired.

SUMMARY

In one embodiment, a light emitting element driving circuit, comprises: a power conversion circuit having a power conversion input terminal configured to receive a power supply voltage, and having a power conversion output terminal configured to provide an output voltage for driving a plurality of parallel connected light emitting elements, wherein the power conversion circuit is configured to convert the power supply voltage into the output voltage; a plurality of light emitting elements, wherein each light emitting element having a first terminal and a second terminal, and wherein the output voltage is applied to the first terminal of each light emitting element; and a current balancing circuit coupled to the second terminal of each light emitting element, wherein the current balancing circuit is configured to provide a driving current to each light emitting element, and wherein the current balancing circuit is further configured to receive a first reference voltage, and based on the first reference voltage, the current balancing circuit is configured to regulate the driving currents flowing through the plurality of light emitting elements such that each driving current flowing through each of the plurality of light emitting elements is substantially similar.

In another embodiment, the light emitting element driving circuit may further comprise a fault detection and protection circuit, wherein, in one embodiment, the fault detection and protection circuit may be configured to monitor a voltage at the second terminal of each light emitting element, and to provide a first feedback signal representing a minimum voltage among the voltages at the second terminals of the light emitting elements to the power conversion circuit so that the power conversion circuit regulates the output voltage based on the first feedback signal; in one embodiment, the fault detection and protection circuit may further be configured to monitor the output voltage at the power conversion output terminal, to detect an over/under-voltage condition at the power conversion output terminal based on the output voltage, and to provide an over/under-voltage indication signal to the power conversion circuit so that the power conversion circuit is shut down by the over/under-voltage indication signal when an over/under-voltage is detected at the power conversion output terminal; in one embodiment, the fault detection and protection circuit may further be configured to detect an open/short circuit condition of each light emitting element based on the voltage at the second terminal of each light emitting element and the output voltage, and to provide a plurality of first trigger signals corresponding to the plurality of light emitting elements so that when one of the plurality of light emitting elements is detected in an open/short circuit condition, the first trigger signal corresponding to that light emitting element marks it off; and in one embodiment, the fault detection and protection circuit may further comprise a system shut-down trigger circuit configured to receive the plurality of first trigger signals, and to provide a second trigger signal based on the plurality of first trigger signals so that the second trigger signal shuts down the light emitting element driving circuit when all the light emitting elements are in an open/short circuit condition.

In still another embodiment, the light emitting element driving circuit may further comprise a phase-shift PWM dimming circuit, wherein the phase-shift PWM dimming circuit comprises: an input terminal configured to receive a PWM input signal having a cycle and a frequency; and a plurality of output terminals configured to output a plurality of PWM dimming signals, wherein the plurality of PWM dimming signals are configured to respectively regulate the plurality of driving currents through the plurality of light emitting elements so that the plurality of driving currents are pulse width modulated and the plurality of light emitting elements are illuminated/distinguished periodically, and wherein the PWM dimming signals for successively illuminating/distinguishing two of the light emitting elements have a predetermined phase difference.

BRIEF DESCRIPTION OF THE DRAWINGS

The following detailed description of the embodiments of the present technology can best be understood when read in conjunction with the following drawings, in which the features are not necessarily drawn to scale but rather are drawn as to best illustrate the pertinent features.

DETAILED DESCRIPTION

Various embodiments of the technology will now be described. In the following description, some specific details, such as example circuits and example values for these circuit components, are included to provide a thorough understanding of embodiments. One skilled in the relevant art will recognize, however, that the technology can be practiced without one or more specific details, or with other methods, components, materials, etc. In other instances, well-known structures, materials, processes or operations are not shown or described in detail to avoid obscuring aspects of the technology.

In one embodiment of the present technology, a light emitting element driving circuit may comprise a power conversion circuit and a current balancing circuit which will be described in detail in the following descriptions. The light emitting element driving circuit in accordance with one embodiment of the present technology may have improved current balancing performance.

In other embodiment of the present technology, the light emitting element driving circuit may further be integrated with fault detection and fault protection functions.

In still other embodiment of the present technology, a current balancing circuit for light emitting element driving circuit is provided.

In yet other embodiment of the present technology, a fault detection and protection circuit for light emitting element driving circuit is further provided.

In addition, for applications with multiple light emitting elements such as LED/LED strings connected in parallel, if dimming is desired for these light emitting elements, a relatively large transient may be provoked in a total output current of the light emitting element driving circuit when these parallel connected light emitting elements are turned on or off with a same phase in an operating cycle, resulting in relatively large noise in the light emitting element driving circuit and even reducing the lifetime of the driving circuit.

Therefore, in still other embodiment of the present technology, a phase-shift pulse width modulation (PWM) dimming circuit is further provided. The phase-shift PWM dimming circuit may cause the multiple light emitting elements which are connected in parallel to be turned on or off with different phases from each other, reducing the noise provoked by the ON/OFF transient of the light emitting elements and increasing the lifetime of the light emitting element driving circuit.

Various embodiments of the present technology further relate to display devices such as LED display and OLED display that comprise the light emitting element driving circuit and/or other related circuits described in this disclosure.

Figure 1:
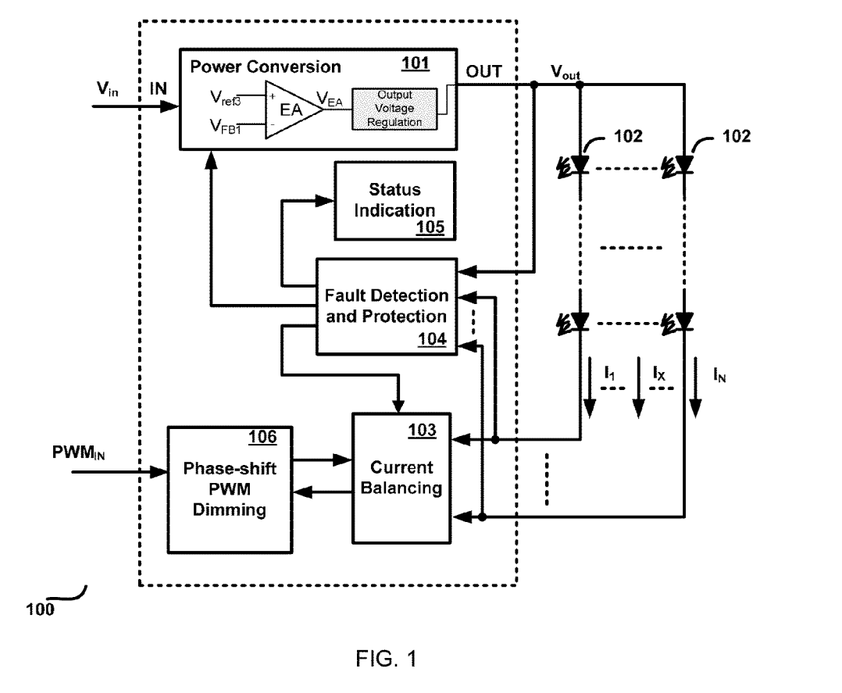
FIG. 1 illustrates schematically a light emitting element driving circuit 100 in accordance with an embodiment of the present technology.

FIG. 1 illustrates schematically a light emitting element driving circuit 100 in accordance with an embodiment of the present technology. The light emitting element driving circuit 100 comprises a power conversion circuit 101 configured to receive a power supply voltage $V_{in}$ at a power conversion input terminal IN and to convert the power supply voltage $V_{in}$ to generate an output voltage $V_{out}$ at a power conversion output terminal OUT for driving a plurality of parallel connected light emitting elements 102 (e.g. N light emitting elements 102 in FIG. 1, wherein N is an integer larger than zero), wherein each light emitting element 102 has a first terminal and a second terminal, and wherein the output voltage $V_{out}$ is applied to the first terminal of each light emitting element 102; a current balancing circuit 103 coupled to the second terminal of each light emitting element 102, wherein the current balancing circuit 103 is configured to provide a driving current $I_X(X=1,\ldots,N)$ to each light emitting element 102, and wherein the current balancing circuit 103 is further configured to receive a first reference voltage and based on the first reference voltage, the current balancing circuit is configured to regulate the driving currents flowing through the plurality of light emitting elements such that each driving current flowing through each of the plurality of light emitting elements is substantially similar/identical . . . .

In the exemplary embodiment shown in FIG. 1, the plurality of light emitting elements 102 comprise N LEDs/LED strings. However those skilled in the art will understand that this is just for purpose of illustration, in other embodiment, the plurality of light emitting elements 102 may comprise other types of light sources that can be driven by the light emitting element driving circuit 102 described in this disclosure.

In one embodiment, the power conversion circuit 101 may comprise a DC-DC converter such as buck converter, boost converter, buck-boost converter etc. In other embodiment, the power conversion circuit 101 may comprise other power management circuits such as AC-DC converter, DC-DC converter and combinations thereof. In the descriptions that follow, a DC-DC converter is taken as an example of the power conversion circuit 101 for explanation and for better understanding of the present technology, however, those skilled in the art should understand that the descriptions are just illustrative and are not intended to be limiting.

In one embodiment, the current balancing circuit 103 may further be configured to generate a second reference voltage based on the first reference voltage, wherein the current balancing circuit 103 regulates the driving current through each light emitting element 102 based on the second reference voltage.

In another embodiment, the light emitting element driving circuit 100 may further comprise a fault detection and protection circuit 104, wherein, in one embodiment, the fault detection and protection circuit 104 may be configured to monitor a voltage at the second terminal of each light emitting element 102, and to provide a first feedback signal representing a minimum voltage among the voltages at the second terminals of the light emitting elements 102 to the power conversion circuit 101 so that the power conversion circuit 101 regulates the output voltage $V_{out}$ based on the first feedback signal; in one embodiment, the fault detection and protection circuit 104 may further be configured to monitor the output voltage $V_{out}$ at the power conversion output terminal OUT, to detect an over/under-voltage condition at the power conversion output terminal OUT based on the output voltage $V_{out}$, and to provide an over/under-voltage indication signal to the power conversion circuit 101 so that the power conversion circuit 101 is shut down by the over/under-voltage indication signal when an over/under-voltage is detected at the power conversion output terminal OUT; in one embodiment, the fault detection and protection circuit 104 may further be configured to detect an open/short circuit condition of each light emitting element 102 based on the voltage at the second terminal of each light emitting element 102 and the output voltage $V_{out}$, and to provide a plurality of first trigger signals corresponding to the plurality of light emitting elements 102 so that when one of the plurality of light emitting elements 102 is detected in an open/short circuit condition, the first trigger signal corresponding to that light emitting element 102 marks it off; and in one embodiment, the fault detection and protection circuit 104 may further comprise a system shut-down trigger circuit configured to receive the plurality of first trigger signals, and to provide a second trigger signal based on the plurality of first trigger signals so that the second trigger signal shuts down the light emitting element driving circuit 100 when all the light emitting elements 102 are in an open/short circuit condition.

In still other embodiment, the light emitting element driving circuit 100 may further comprise a status indication circuit 105 configured to receive the over/under-voltage indication signal and the second trigger signal, and to generate a status indication signal based on the over/under-voltage indication signal and the second trigger signal, wherein the status indication signal indicates the operation status of the light emitting element driving circuit 100, such as in normal condition or in fault and protection condition. In this way, other outside circuits related to the light emitting element driving circuit 100 may be able to judge the operation status of the light emitting element driving circuit 100 based on the status indication signal.

In yet other embodiment, the light emitting element driving circuit 100 may further comprise a phase-shift PWM dimming circuit 106 coupled to the current balancing circuit 103, wherein the phase-shift PWM dimming circuit 106 is configured to provide a plurality of PWM dimming signals to regulate the current balancing circuit 103 for dimming (illuminating/distinguishing periodically) the plurality of light emitting elements 102, wherein the plurality of PWM dimming signals have different phases in an operating cycle T. In one embodiment, the plurality of PWM dimming signals regulate the current balancing circuit 103 so that the driving current IX (X=1, ..., N) through each light emitting element 102 is pulse width modulated (i.e. the driving current IX (X=1, ..., N) through each light emitting element 102 turns to be a PWM driving current) and the PWM driving currents (e.g. I1~IN in FIG. 1) through the plurality of light emitting elements 102 have different phases from each other. In one embodiment, the PWM driving signals for successively illuminating/distinguishing two of the light emitting elements 102 may have a predetermined phase difference, resulting in the PWM driving currents (IX and I(X+1), X=1, ..., N−1) through two successively illuminated/distinguished light emitting elements 102 having the predetermined phase difference. In an exemplary embodiment, the predetermined phase difference is $2\pi/N$, wherein N represents the number of light emitting elements 102 connected in parallel as mentioned above.

Figure 2:
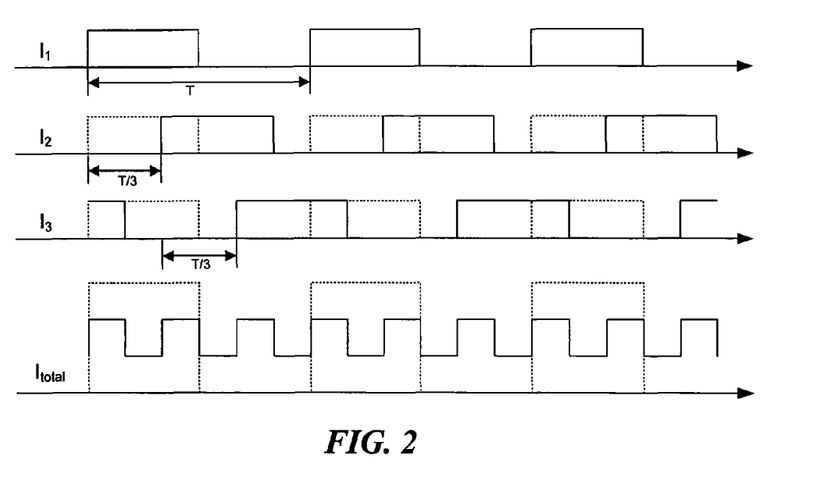
FIG. 2 illustrates schematically a phase-shift PWM dimming waveform diagram of the PWM driving currents through the light emitting elements and the total output current of the light emitting element driving circuit 100 when the number of parallel connected light emitting elements is 3.

FIG. 2 shows schematically a waveform diagram illustrating the driving currents I1, I2 and I3 through the light emitting elements 102 and the total output current Itotal of the light emitting element driving circuit 100 when the light emitting element driving circuit 100 is in phase-shift PWM dimming mode and the number of parallel connected light emitting elements 102 is 3. It can be seen from FIG. 2 that during an operating cycle T, the driving currents through two successively illuminated/distinguished light emitting elements 102 have a T/3 delay on the time axe t, corresponding to a phase difference of $2\pi/3$ between the PWM dimming signals for successively illuminating/distinguishing two of the light emitting elements 102. It can also be seen from FIG. 2 that a variation in amplitude of the total output current Itotal caused by the ON/OFF transient of the light emitting elements 102 is reduced to ⅓ of that when the PWM driving currents I1, I2 and I3 have the same phase (represented in dot line in FIG. 2). Thus, the phase-shift PWM dimming circuit 106 may help to reduce the variation in amplitude of the total output current Itotal caused by the ON/OFF transient of the light emitting elements 102 when the light emitting element driving circuit 100 performs PWM dimming function, resulting in a reduction of load and noise on input and output capacitors of the light emitting element driving circuit 100. In other words, the light emitting driving circuit 100 with a phase-shift PWM dimming circuit 106 according to one embodiment of the present technology permits using smaller input and output capacitors while still satisfies the noise criteria required in most applications wherein PWM dimming for the light emitting elements are desired. Using smaller input and output capacitors can help in reducing the size and production cost of the light emitting element driving circuit 100.

Figure 3:
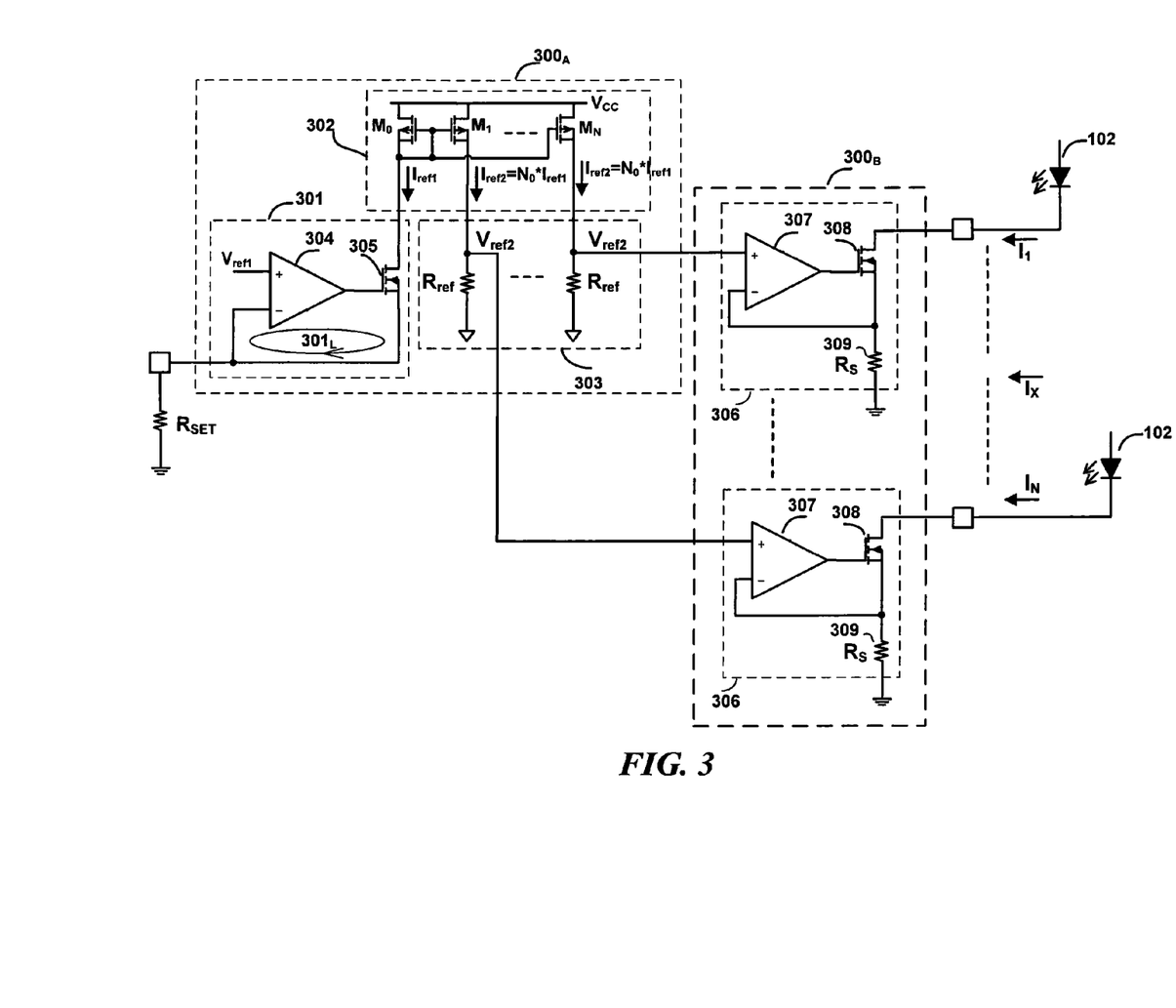
FIG. 3 illustrates schematically a current balancing circuit 103 in accordance with one embodiment of the present technology.

FIG. 3 illustrates schematically a current balancing circuit 103 in accordance with one embodiment of the present technology. The current balancing circuit 103 may comprise a reference voltage generating unit 300$_A$ configured to receive a first reference voltage $V_{ref1}$, and to generate a first reference current $I_{ref1}$ based on the first reference voltage $V_{ref1}$, wherein based on the first reference current $I_{ref1}$, the reference voltage generating unit is configured to generate a plurality of identical second reference voltages $V_{ref2}$; a current regulating unit 300$_B$ configured to receive the plurality of second reference voltages $V_{ref2}$, to detect the plurality of driving currents ($I_1$~$I_N$ in FIG. 3) flowing through the plurality of light emitting elements 102 to provide a plurality of feedback voltages respectively representing the plurality of driving currents, and to compare each feedback voltage with one of the plurality of second reference voltages $V_{ref2}$ to regulate the driving current corresponding to the feedback voltage via negative feedback regulation.

In one embodiment, the reference voltage generating unit 300$_A$ may be coupled to a peripheral electrical element $R_{SET}$ with the peripheral electrical element $R_{SET}$ coupled in series with the first reference voltage $V_{ref1}$, wherein the reference voltage generating unit 300$_A$ may adjust the first reference current $I_{ref1}$ by adjusting the first reference voltage $V_{ref1}$ and/or the peripheral electrical element $R_{SET}$. In one embodiment, the peripheral electrical element $R_{SET}$ may comprise a resistor provided from outside of the light emitting element driving circuit 100, wherein the resistor can be easily chosen and replaced by the users according to different application environments.

In one exemplary embodiment, the reference voltage generating unit 300$_A$ may comprise a current reference circuit 301 having a first input terminal, a second input terminal and an output terminal, wherein the first input terminal is configured to receive the first reference voltage $V_{ref1}$, the second input terminal is coupled to the peripheral electrical element $R_{SET}$, and wherein the current reference circuit 301 is configured to generate the first reference current $I_{ref1}$ at the output terminal based on the first reference voltage $V_{ref1}$ and the peripheral electrical element $R_{SET}$; a current mirror circuit 302 having an input terminal and a plurality of output terminals, wherein the input terminal is configured to receive the first reference current $I_{ref1}$, and wherein the current mirror circuit 302 is configured to output a plurality of second reference currents $I_{ref2}$ mirroring the first reference current $I_{ref1}$ with a same ratio $N_o$ at respectively the plurality of output terminals (i.e. $I_{ref2}=N_0*I_{ref1}$); and a voltage reference circuit 303 having a plurality of input terminals and a plurality of output terminals, wherein the plurality of input terminals are configured to respectively receive the plurality of second reference currents $I_{ref2}$ and the plurality of output terminals are configured to respectively output the plurality of second reference voltages $V_{ref2}$, and wherein the voltage reference circuit 303 is configured to convert the plurality of second reference currents $I_{ref2}$ into the plurality of second reference voltages $V_{ref2}$.

In one embodiment, as illustrated in FIG. 3, the current reference circuit 301 may comprise a first operational amplifier 304 having a first input terminal, a second input terminal and an output terminal, wherein the first input terminal is configured to receive the first reference voltage $V_{ref1}$, and the second input terminal is coupled to the peripheral electrical element $R_{SET}$; and a first controllable current source 305 having a first current terminal, a second current terminal and a control terminal, wherein the first current terminal is coupled to the second input terminal of the first operational amplifier 304, the control terminal is coupled to the output terminal of the first operational amplifier 304 and the second current terminal is configured to output the first reference current $I_{ref1}$. In such configuration, a negative feedback loop $301_L$ is formed for regulating the first reference current $I_{ref1}$ based on the first reference voltage $V_{ref1}$ and the peripheral electrical element $R_{SET}$.

In one embodiment, the first controllable current source 305 may comprise a MOSFET having a source terminal coupled to the second input terminal of the first operational amplifier 304, a gate terminal coupled to the output terminal of the first operational amplifier 304 and a drain terminal configured to provide the first reference current $I_{ref1}$.

In one embodiment, the current mirror circuit 302 may comprise a plurality of sub current mirror circuits coupled in parallel, wherein the plurality of sub current mirror circuits have a common input terminal configured to receive the first reference current $I_{ref1}$, and each has an output terminal configured to output the second reference current $I_{ref2}$. In one embodiment, as illustrated in FIG. 3, the plurality of sub current mirror circuits each comprises a branch MOSFET ($M_1$~$M_N$) coupled to a main MOSFET $M_0$, wherein the main MOSFET $M_0$ has a drain terminal coupled to a power supply $V_{CC}$, a source terminal configured to receive the first reference current $I_{ref1}$ and a gate terminal coupled to the source terminal, and wherein each branch MOSFET has a drain terminal coupled to the power supply $V_{CC}$, a gate terminal coupled to the gate terminal of the main MOSFET $M_0$ and a source terminal configured to output the second reference current $I_{ref2}$. In one embodiment, each branch MOSFET has a channel width and length ratio that is $N_0$ times of a channel width and length ratio of the main MOSFET $M_0$.

In one embodiment, the voltage reference circuit 303 may comprise a plurality of resistors $R_{ref}$ of a same resistance, wherein each resistor $R_{ref}$ has a first terminal configured to receive one of the plurality of second reference currents $I_{ref2}$ and a second terminal connected to ground, and wherein the plurality of second reference voltages $V_{ref2}$ are respectively generated at the first terminal of the plurality of resistors $R_{ref}$.

In one exemplary embodiment, the current regulating unit $300_B$ may comprise a plurality of current regulators 306, wherein each current regulator 306 comprises a second operational amplifier 307 having a first input terminal, a second input terminal and an output terminal, wherein the first input terminal is configured to receive one of the plurality of second reference voltages $V_{ref2}$; a second controllable current source 308 having a first current terminal, a second current terminal and a control terminal, wherein the first current terminal is coupled to one of the plurality of light emitting elements 102 at the second terminal of the corresponding light emitting element 102 to provide a driving current $I_X$ (X=1, . . . , N) flowing through the corresponding light emitting element 102, the control terminal is coupled to the output terminal of the second operational amplifier 307; and a current sensing circuit 309 having an input terminal and an output terminal, wherein the input terminal is coupled to the second current terminal of the second controllable current source 308 for detecting the driving current $I_X$ (X=1, . . . , N) flowing through the light emitting element 102, and the output terminal is configured to provide a feedback voltage $V_X$ (X=1, . . . , N) representing the driving current $I_X$ to the second input terminal of the second operational amplifier 307. In such configuration, the second operational amplifier 307 compares the feedback voltage $V_X$ with the reference voltage $V_{ref2}$ to provide an error signal to the control terminal of the second controllable current source 308 to regulate the driving current $I_X$ so that the feedback voltage $V_X$ follows the second reference voltage $V_{ref2}$. That is to say, each current regulator 306 regulates the driving current provided to a corresponding light emitting element 102 with negative feedback regulation so that the driving currents (e.g. $I_1$~$I_N$ in FIG. 3) flowing through the plurality of light emitting elements 102 are stable and substantially identical (i.e. matching).

In one embodiment, the second controllable current source 308 may comprise a MOSFET having a drain terminal coupled to the second terminal of the light emitting element 102 corresponding to the second controllable current source 308, a gate terminal coupled to the output terminal of the second operational amplifier 307 and a source terminal coupled to input terminal of the current sensing circuit 309.

In one embodiment, the current sensing circuit 309 may comprise a sensing resistor $R_S$ having a first terminal and a second terminal, wherein the first terminal of the sensing resistor $R_S$ is coupled to the second current terminal of the second controllable current source 308 and the second input terminal of the second operational amplifier 307, functioning as both the input terminal and the output terminal of the current sensing circuit 309; and wherein the second terminal of the sensing resistor $R_S$ is connected to ground.

Figure 4:
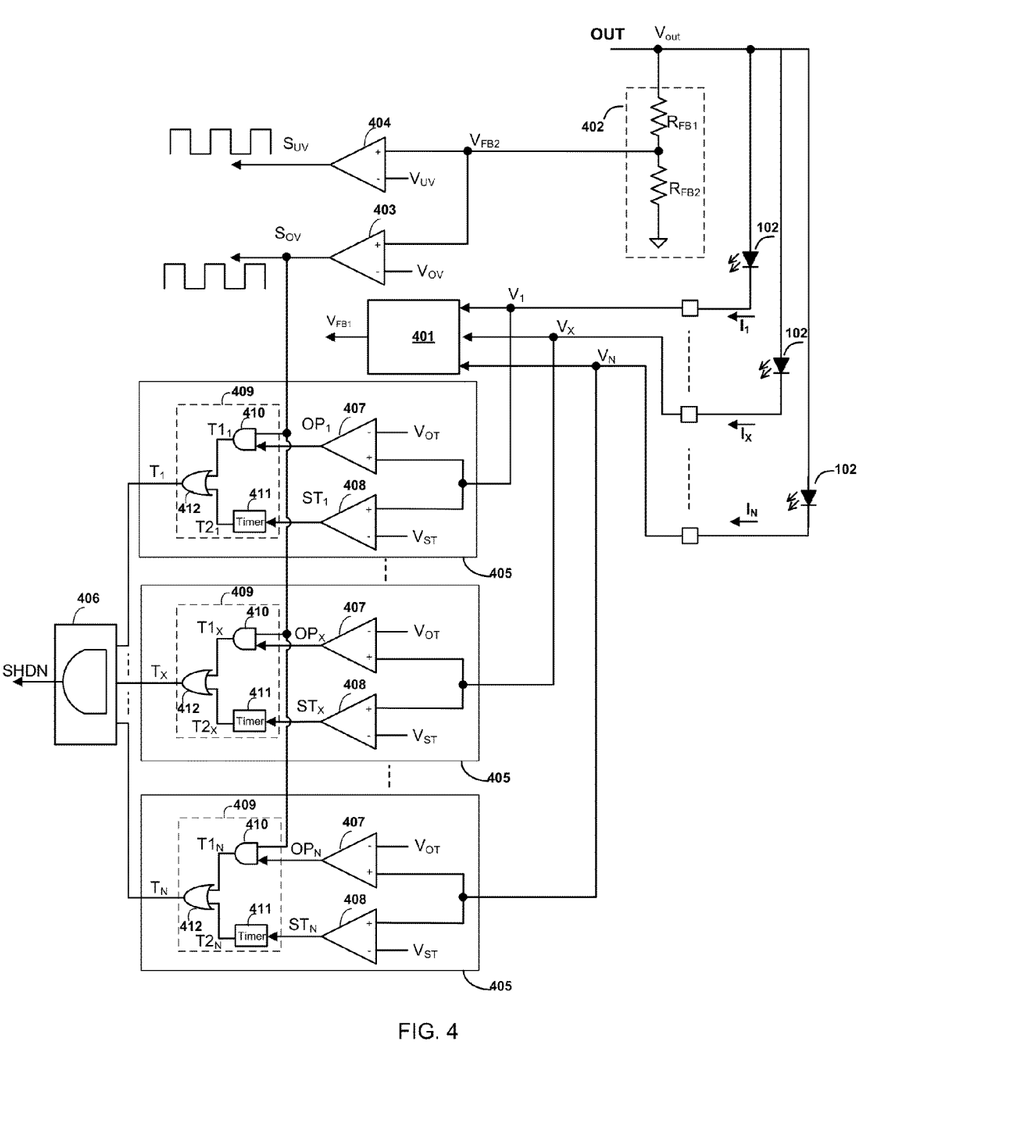
FIG. 4 illustrates schematically a fault detection and protection circuit 104 in accordance with one embodiment of the present technology.

FIG. 4 illustrates schematically a fault detection and protection circuit 104 in accordance with one embodiment of the present technology. In one embodiment, the fault detection and protection circuit 104 may comprise a first feedback circuit 401 having a plurality of input terminals and an output terminal, wherein the plurality of input terminals are respectively coupled to the second terminals of the plurality of light emitting elements 102 for monitoring the voltages at the second terminals of the plurality of light emitting elements 102, and the output terminal is configured to provide a first feedback signal $V_{FB1}$ representing a minimum voltage among the voltages at the second terminals of the light emitting elements 102; and wherein the first feedback signal $V_{FB1}$ is fed to the power conversion circuit 101 and compared with a third reference voltage $V_{ref3}$ to provide an amplified error signal $V_{EA}$; and wherein the power conversion circuit 101 regulates the output voltage $V_{out}$ at the power conversion output terminal OUT based on the amplified error signal $V_{EA}$.

In one embodiment, referring to FIG. 1, the power conversion circuit 101 may comprise an error amplifier EA configured to receive the first feedback signal $V_{FB1}$ at a first amplifier input terminal, to receive the third reference voltage $V_{ref3}$ at a second amplifier input terminal and to output the amplified error signal $V_{EA}$ at an amplifier output terminal.

In one embodiment, the first feedback circuit 401 may comprise a minimum voltage selection circuit that is familiar to those skilled in the art and will not be described in detail herein to avoid obscuring other aspects of the present technology.

In other embodiment, the fault detection and protection circuit 104 may further comprise a second feedback circuit 402 having an input terminal coupled to the power conversion output terminal OUT of the light emitting element driving circuit 100 to receive the output voltage $V_{out}$, and an output terminal configured to provide a second feedback signal $V_{FB2}$ representing the output voltage $V_{out}$. In the exemplary embodiment shown in FIG. 4, the second feedback circuit comprises a resistor divider comprising a first resistor $R_{FB1}$ and a second resistor $R_{FB2}$ coupled in series between the output terminal OUT of the light emitting element driving circuit 100 and ground, wherein the second feedback signal $V_{FB2}$ is generated at a connection FB between the first resistor $R_{FB1}$ and the second resistor $R_{FB2}$.

In other embodiment, the fault detection and protection circuit 104 may further comprise an over-voltage detection circuit 403 having a first input terminal configured to receive the second feedback signal $V_{FB2}$, a second input terminal configured to receive an over-voltage threshold $V_{OV}$, and an output terminal configured to output an over-voltage indication signal $S_{OV}$ based on the second feedback signal $V_{FB2}$ and the over-voltage threshold $V_{OV}$; wherein the over-voltage indication signal $S_{OV}$ has an over-voltage logic state representing an over-voltage condition at the power conversion output terminal OUT and a normal logic state representing a normal condition at the power conversion output terminal OUT; and wherein the over-voltage indication signal $S_{OV}$ is at the over-voltage logic state when the second feedback signal $V_{FB2}$ is higher than the over-voltage threshold $V_{OV}$; and wherein the over-voltage indication signal $S_{OV}$ is at the normal logic state when the second feedback signal $V_{FB2}$ is lower than the over-voltage threshold $V_{OV}$. In one embodiment, the over-voltage indication signal $S_{OV}$ may be fed to the power conversion circuit 101 to shut down the power conversion circuit 101 when the over-voltage indication signal $S_{OV}$ is at the over-voltage logic state. In one embodiment, the over-voltage detection circuit 403 may comprise an over-voltage comparator having a first input terminal, a second input terminal and an output terminal, wherein the first input terminal is configured to receive the second feedback signal $V_{FB2}$, the second input terminal is configured to receive the over-voltage threshold $V_{OV}$, and wherein the over-voltage comparator compares the second feedback signal $V_{FB2}$ with the over-voltage threshold $V_{OV}$ to provide the over-voltage indication signal $S_{OV}$ at the output terminal.

In other embodiment, the fault detection and protection circuit 104 may further comprise an under-voltage detection circuit 404 having a first input terminal configured to receive the second feedback signal $V_{FB2}$, a second input terminal configured to receive an under-voltage threshold $V_{UV}$ and an output terminal configured to output an under-voltage indication signal $S_{UV}$ based on the second feedback signal $V_{FB2}$ and the under-voltage threshold $V_{UV}$; wherein the under-voltage indication signal $S_{UV}$ has an under-voltage logic state representing an under-voltage condition at the power conversion output terminal and a normal logic state representing a normal condition at the power conversion output terminal; and wherein the under-voltage indication signal $S_{UV}$ is at the under-voltage logic state when the second feedback signal $V_{FB2}$ is lower than the under-voltage threshold $V_{UV}$; and wherein the under-voltage indication signal $S_{UV}$ is at the normal logic state when the second feedback signal $V_{FB2}$ is higher than the under-voltage threshold $V_{UV}$. In one embodiment, the under-voltage indication signal $S_{UV}$ may be fed to the power conversion circuit 101 to shut down the power conversion circuit 101 when the under-voltage indication signal $S_{UV}$ is at the under-voltage logic state. In one embodiment, the under-voltage detection circuit 404 may comprise an under-voltage comparator having a first input terminal, a second input terminal and an output terminal, wherein the first input terminal is configured to receive the second feedback signal $V_{FB2}$, the second input terminal is configured to receive the under-voltage threshold $V_{UV}$, and wherein the under-voltage comparator compares the second feedback signal $V_{FB2}$ with the under-voltage threshold $V_{UV}$ to provide the under-voltage indication signal $S_{UV}$ at the output terminal.

In other embodiment, the fault detection and protection circuit 104 may further comprise a plurality of light emitting element protection circuits 405, wherein each light emitting element protection circuit 405 is configured to correspondingly couple one of the plurality of light emitting elements 102 at the second terminal of the corresponding light emitting element 102 to receive the voltage $V_X$ (X=1, . . . , N) at the second terminal of the corresponding light emitting element 102; and wherein each light emitting element protection circuit 405 is further configured to detect an open/short circuit condition (a fault condition) of the corresponding light emitting element 102 based on the voltage $V_X$; and wherein each light emitting element protection circuit 405 is further configured to receive the over-voltage indication signal $S_{OV}$ and to provide a first trigger signal $T_X$ based on the open/short circuit condition of the corresponding light emitting element 102 and the over-voltage indication signal $S_{OV}$; and wherein the first trigger signal $T_X$ has a trigger logic state and a normal logic state; and wherein the first trigger signal $T_X$ is at the trigger logic state when the corresponding light emitting element 102 is detected in open circuit condition and the over-voltage indication signal $S_{OV}$ is at the over-voltage logic state or when the corresponding light emitting element 102 is detected in short circuit condition, else the first trigger signal $T_X$ is at the normal logic state; and wherein the first trigger signal $T_X$ is configured to mark off the corresponding light emitting element 102 when the first trigger signal $T_X$ is at the trigger logic state.

In one embodiment, the first trigger signal $T_X$ is provided to control the current balancing circuit 103 for implementing the marking off of the corresponding light emitting element 102. For example, when the first trigger signal $T_X$ is at the trigger logic state, it may control the current balancing circuit 103 not to provide the driving current for the corresponding light emitting element 102, i.e. the corresponding light emitting element 102 is marked off. Take the current balancing circuit 103 illustrated in FIG. 3 as an example, in one embodiment, each current regulator 306 may further comprise an enable/disable terminal (not shown in FIG. 3) configured to receive the first trigger signal $T_X$ (X=1, . . . , N) corresponding to the light emitting element 102 coupled to the corresponding current regulator 306, wherein when the first trigger signal $T_X$ is at the trigger logic state, it disables the corresponding current regulator 306, and wherein when the first trigger signal $T_X$ is at the normal logic state, it enables the corresponding current regulator 306.

In one embodiment, as illustrated in FIG. 4, each light emitting element protection circuit 405 may comprise: an open circuit detection comparator 407 having a first input terminal configured to receive the voltage $V_X$ at the second terminal of the corresponding light emitting element 102, a second input terminal configured to receive an open circuit threshold $V_{OT}$, and an output terminal configured to output an open circuit indication signal $OP_X$ based on a comparison result between the voltage $V_X$ at the second terminal of the corresponding light emitting element 102 and the open circuit threshold $V_{OT}$, wherein the open circuit indication signal $OP_X$ has an open circuit logic state representing an open circuit condition of the corresponding light emitting element 102 and a normal logic state representing a normal condition of the corresponding light emitting element 102, and wherein the open circuit indication signal $OP_X$ is at the open circuit logic state when the voltage $V_X$ at the second terminal of the corresponding light emitting element 102 is lower than the open circuit threshold $V_{OT}$, and wherein the open circuit indication signal $OP_X$ is at the normal logic state when the voltage $V_X$ at the second terminal of the corresponding light emitting element 102 is higher than the open circuit threshold $V_{OT}$; a short circuit detection comparator 408 having a first input terminal configured to receive the voltage $V_X$ at the second terminal of the corresponding light emitting element 102, a second input terminal configured to receive a short circuit threshold $V_{ST}$, and an output terminal configured to output a short circuit indication signal $ST_X$ based on a comparison result between the voltage $V_X$ at the second terminal of the corresponding light emitting element 102 and the short circuit threshold $V_{ST}$, wherein the short circuit indication signal $ST_X$ has a short circuit logic state representing a short circuit condition of the corresponding light emitting element 102 and a normal logic state representing a normal condition of the corresponding light emitting element 102, and wherein the short circuit indication signal $ST_X$ is at the short circuit logic state when the voltage $V_X$ at the second terminal of the corresponding light emitting element 102 is higher than the short circuit threshold $V_{ST}$, and wherein the short circuit indication signal $ST_X$ is at the normal logic state when the voltage $V_X$ at the second terminal of the corresponding light emitting element 102 is lower than the short circuit threshold $V_{ST}$; and a trigger circuit 409 having a first input terminal configured to receive the over-voltage indication signal $S_{OV}$, a second input terminal configured to receive the open circuit indication signal $OP_X$, a third input terminal configured to receive the short circuit indication signal $ST_X$, and an output terminal configured to output the first trigger signal $T_X$ based on the over-voltage indication signal $S_{OV}$, the open circuit indication signal $OP_X$ and the short circuit indication signal $ST_X$, wherein the first trigger signal $T_X$ is at the trigger logic state when the open circuit indication signal $OP_X$ is at the open circuit logic state and the over-voltage indication signal $S_{OV}$ is at the over-voltage logic state or when the short circuit indication signal $ST_X$ is at the short circuit logic state for a duration longer than a predetermined duration threshold, else the first trigger signal $T_X$ is at the normal logic state.

In one exemplary embodiment as illustrated in FIG. 4, the trigger circuit 409 may comprise a first logic circuit 410 having a first input terminal configured to receive the over-voltage indication signal $S_{OV}$, a second input terminal configured to receive the open circuit indication signal $OP_X$, and an output terminal configured to output a first intermediate trigger signal $T1_X$ having a trigger logic state and a normal logic state; wherein the first intermediate trigger signal $T1_X$ is at the trigger logic state when the open circuit indication signal $OP_X$ is at the open circuit logic state and the over-voltage indication signal $S_{OV}$ is at the over-voltage logic state, else the first intermediate trigger signal $T1_X$ is at the normal logic state; a timer 411 having the predetermined duration threshold, wherein the timer 411 may comprise an input terminal configured to receive the short circuit indication signal $ST_X$, and an output terminal configured to output a second intermediate trigger signal $T2_X$ having a trigger logic state and a normal logic state, and wherein when the short circuit indication signal $ST_X$ changes to the short circuit logic state, the timer 411 is triggered to time a duration of the short circuit logic state of the short circuit indication signal $ST_X$, and wherein the second intermediate trigger signal $T2_X$ is at the trigger logic state when the duration of the short circuit logic state exceeds the predetermined duration threshold, and wherein the second intermediate trigger signal $T2_X$ is at the normal logic state when the short circuit indication signal $ST_X$ is at the normal logic state or when the duration of the short circuit logic state is below the predetermined duration threshold; and a second logic circuit 412 having a first input terminal configured to receive the first intermediate trigger signal $T1_X$, a second input terminal configured to receive the second intermediate trigger signal $T2_X$, and an output terminal configured to output the first trigger signal $T_X$, wherein the first trigger signal $T_X$ is at the trigger logic state when at least one of the first intermediate trigger signal $T1_X$ and the second intermediate trigger signal $T2_X$ is at the trigger logic state, and wherein the first trigger signal $T_X$ is at the normal logic state when both the first intermediate trigger signal $T1_X$ and the second intermediate trigger signal $T2_X$ are in normal logic state. In the exemplary embodiment shown in FIG. 4, the first logic circuit 410 comprises an AND gate, and the second logic circuit 412 comprises an OR gate, however this is not intended to be limiting.

In other embodiment, the fault detection and protection circuit 104 may further comprise a system shut-down trigger circuit 406, wherein the system shut-down trigger circuit 406 is configured to receive all of the first trigger signals $T_X$ (e.g. $T_1$~$T_N$ in FIG. 4) from the plurality of light emitting element protection circuits 405, and to provide a second trigger signal SHDN based on all the first trigger signals $T_X$; and wherein the second trigger signal SHDN has a trigger logic state and a normal logic state; and wherein the second trigger signal SHDN is at the trigger logic state when all the first trigger signals $T_X$ are at the trigger logic states, else (i.e. when at least one of the first trigger signals $T_X$ is at its normal logic state) the second trigger signal SHDN is at the normal logic state; and wherein the second trigger signal SHDN is configured to shut down the light emitting element driving circuit 100 when the second trigger signal SHDN is at the trigger logic state. In one embodiment, as illustrated in FIG. 4, the system shut-down trigger circuit 406 may comprise an AND logic circuit.

Figure 5:
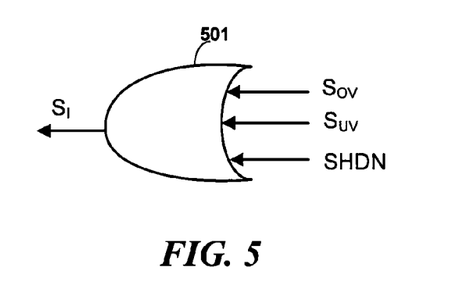
FIG. 5 illustrates schematically a status indication circuit 105 in accordance with one embodiment of the present technology.

FIG. 5 illustrates schematically a status indication circuit 105 in accordance with one embodiment of the present technology. The status indication circuit 105 may comprise an OR logic circuit 501 such as an OR gate or other equivalent logic circuits, wherein the OR logic circuit 501 comprises a first input terminal configured to receive the over-voltage indication signal $S_{OV}$, a second input terminal configured to receive the under-voltage indication signal $S_{UV}$, a third input terminal configured to receive the second trigger signal SHDN, and an output terminal configured to output a status indication signal $S_I$ having a fault logic state and a normal logic state; wherein the status indication signal $S_I$ is at the fault logic state when the over-voltage indication signal is at the over-voltage logic state or the under-voltage indication signal is at the under-voltage logic state or the second trigger signal SHDN is at the trigger logic state, else the status indication signal $S_I$ is at the normal logic state; and wherein the fault logic state of the status indication signal $S_I$ represents that the light emitting element driving circuit 100 is in fault and protection condition and the normal logic state of the status indication signal $S_I$ represents that the light emitting element driving circuit 100 is in normal condition.

Figure 6:
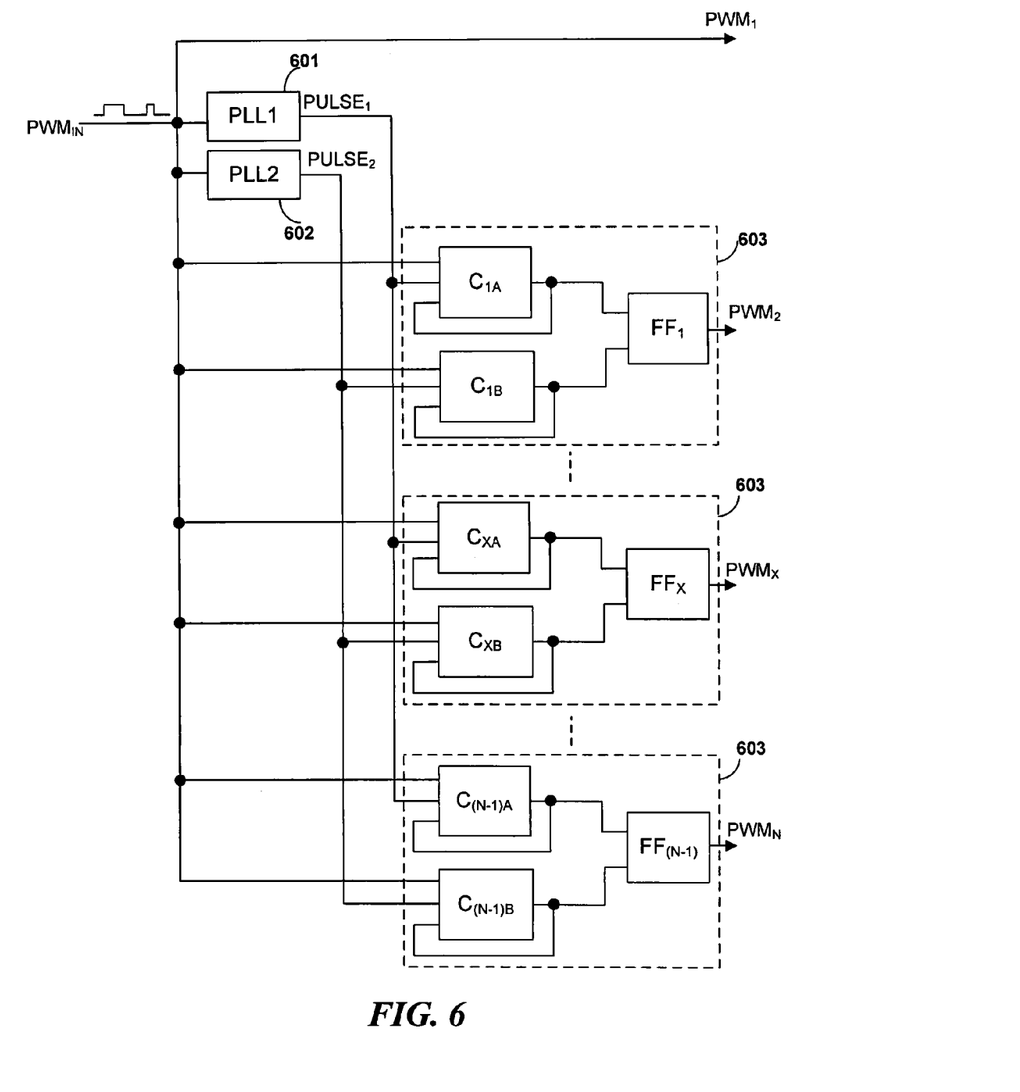
FIG. 6 illustrates schematically a phase-shift PWM dimming circuit 106 in accordance with one embodiment of the present technology.

FIG. 6 illustrates schematically a phase-shift PWM dimming circuit 106 in accordance with one embodiment of the present technology. The phase-shift PWM dimming circuit 106 may comprise an input terminal configured to receive a PWM input signal $PWM_{IN}$ having a cycle and a frequency, and a plurality of output terminals configured to output a plurality of PWM dimming signals (e.g. $PWM_1$~$PWM_N$ in FIG. 6), wherein the plurality of PWM dimming signals are configured to respectively regulate the plurality of driving currents through the plurality of light emitting elements 102 so that the plurality of driving currents are pulse width modulated and the plurality of light emitting elements 102 are illuminated/distinguished periodically, and wherein the PWM dimming signals for successively illuminating/distinguishing two of the light emitting elements 102 have a predetermined phase difference. In one exemplary embodiment where the number of the plurality of light emitting elements 102 is N, the predetermined phase difference is $2\pi/N$. That is to say, in the time domain, the PWM dimming signals for successively illuminating/distinguishing two light emitting elements 102 have a time delay of T/N, wherein T represents the cycle of the PWM input signal $PWM_{IN}$.

In one embodiment, the phase-shift PWM dimming circuit 106 may comprise N−1 delay circuits configured to receive the PWM input signal $PWM_{IN}$ and to respectively delay the PWM input signal $PWM_{IN}$ for T/N, 2T/N, . . . , and (N−1)T/N to generate the PWM dimming signals $PWM_2$, $PWM_3$, . . . , and $PWM_N$, wherein the PWM input signal $PWM_{IN}$ is directly output as the PWM dimming signal $PWM_1$.

Take the current balancing circuit 103 illustrated in FIG. 3 as an example, in one embodiment, each current regulator 306 may further comprise an enable/disable terminal (not shown in FIG. 3) configured to receive one of the PWM dimming signals $PWM_1$~$PWM_N$, wherein the current regulators 306 are respectively enabled/disabled alternately by the corresponding PWM dimming signals $PWM_1$~$PWM_N$, so that the current regulators 306 respectively provide the driving currents $I_N$ to the plurality of light emitting elements 102 intermittently, in other words, the driving currents $I_1$~$I_N$ through the plurality of light emitting elements 102 are respectively pulse width modulated by the plurality of PWM dimming signals $PWM_1$~$PWM_N$.

In the exemplary embodiment illustrated in FIG. 6, the phase-shift PWM dimming circuit 106 may comprise a frequency multiplier module $700_A$ configured to receive the PWM input signal $PWM_{IN}$ having a cycle and a frequency and to generate a first sequence pulse signal $PULSE_1$ and a second sequence pulse signal $PULSE_2$, wherein the first sequence pulse signal $PULSE_1$ is generated by multiplying the frequency of the PWM input signal $PWM_{IN}$ by N times at each rising edge of the PWM input signal $PWM_{IN}$, and wherein the second sequence pulse signal $PULSE_2$ is generated by multiplying the initial frequency of the PWM input signal $PWM_{IN}$ by N times at each falling edge of the PWM input signal $PWM_{IN}$; and a delay module $700_B$ configured to receive the first sequence pulse signal $PULSE_1$ and the second sequence pulse signal $PULSE_2$, and to generate the PWM dimming signals $PWM_2$~$PWM_N$ based on counting the pulses of the first sequence pulse signal $PULSE_1$ and the second sequence pulse signal $PULSE_2$, wherein the delay module $700_B$ is configured to respectively generate the rising edges of the PWM dimming signals $PWM_2$~$PWM_N$ when respectively 2 to N pluses of the first sequence pulse signal $PULSE_1$ are counted, and wherein the delay module $700_B$ is further configured to respectively generate the falling edges of the PWM dimming signals $PWM_2$~$PWM_N$ when respectively 2 to N pluses of the second sequence pulse signal $PULSE_2$ are counted.

In one embodiment, as illustrated in FIG. 6, the frequency multiplier module $700_A$ may comprise a first frequency multiplier circuit 601 configured to receive the PWM input signal $PWM_{IN}$ and to generate the first sequence pulse signal $PULSE_1$, wherein the first frequency multiplier circuit 601 is triggered to multiply the frequency of the PWM input signal $PWM_{IN}$ by N times at each rising edge of the PWM input signal $PWM_{IN}$; and a second frequency multiplier circuit 602 configured to receive the PWM input signal $PWM_{IN}$ and to generate the second sequence pulse signal $PULSE_2$, wherein the second frequency multiplier circuit 602 is triggered to multiply the frequency of the PWM input signal $PWM_{IN}$ by N times at each falling edge of the PWM input signal $PWM_{IN}$. In one embodiment, the first frequency multiplier circuit 601 may comprise a first phase-locked loop circuit $PLL_1$, and the second frequency multiplier circuit 602 may comprise a second phase-locked loop circuit $PLL_2$.

In one embodiment, as illustrated in FIG. 6, the delay module $700_B$ may comprise N−1 delay circuits 603 indexed from 1 to N−1, wherein each delay circuit 603 is configured to receive the PWM input signal $PWM_{IN}$, the first sequence pulse signal $PULSE_1$ and the second sequence pulse signal $PULSE_2$; and wherein the delay circuits 603 indexed from 1 to N−1 are respectively configured to output the PWM dimming signals $PWM_2$ to $PWM_N$; and wherein the delay circuits 603 indexed from 1 to N−1 are respectively triggered to count the positive pulses of the first sequence pulse signal $PULSE_1$ at each rising edge of the PWM input signal $PWM_{IN}$ to respectively generate a rising edge for the PWM dimming signals $PWM_2$ to $PWM_N$ when 2 to N positive pulses are counted; and wherein the delay circuits 603 indexed from 1 to N−1 are respectively triggered to count the negative pulses of the second sequence pulse signal $PULSE_2$ at each falling edge of the PWM input signal $PWM_{IN}$ to respectively generate a falling edge for the PWM dimming signals $PWM_2$ to $PWM_N$ when 2 to N negative pulses are counted.

In the exemplary embodiment illustrated in FIG. 6, the delay circuit 603 indexed by X (X=1, . . . , N−1) may comprise a positive pulse counter $C_{XA}$ having an enable terminal, a counting input terminal, a reset terminal and an output terminal, wherein the enable terminal is configured to receive the PWM input signal $PWM_{IN}$, the counting input terminal is configured to receive the first sequence pulse signal $PULSE_1$, the output terminal is configured to output a first pulse signal $Q_{XA}$ based on the PWM input signal $PWM_{IN}$ and the first sequence pulse signal $PULSE_1$, and the reset terminal is configured to receive the first pulse signal $Q_{XA}$; and wherein the positive pulse counter $C_{XA}$, is trigged to count the positive pulses of the first sequence pulse signal $PULSE_1$ when the rising edge of the PWM input signal $PWM_{IN}$ comes at the enable terminal; and wherein the positive pulse counter $C_{XA}$ is configured to output the first pulse signal $Q_{XA}$ when (X+1) positive pulses are counted to reset the positive pulse counter $C_{XA}$; a negative pulse counter $C_{XB}$ having an enable terminal, a counting input terminal, a reset terminal and an output terminal, wherein the enable terminal is configured to receive the PWM input signal $PWM_{IN}$, the counting input terminal is configured to receive the second sequence pulse signal $PULSE_2$, the output terminal is configured to output a second pulse signal $Q_{XB}$ based on the PWM input signal $PWM_{IN}$ and the second sequence pulse signal $PULSE_2$, and the reset terminal is configured to receive the second pulse signal $Q_{XB}$; and wherein the negative pulse counter $C_{XB}$ is trigged to count the negative pulses of the second sequence pulse signal $PULSE_2$ when the falling edge of the PWM input signal $PWM_{IN}$ comes at the enable terminal; and wherein the negative pulse counter $C_{XB}$ is configured to output the second pulse signal $Q_{XA}$ when (X+1) negative pulses are counted to reset the negative pulse counter $C_{XB}$; and a flip-flop $FF_X$ having a set terminal configured to receive the first pulse signal $Q_{X4}$, a reset terminal configured to receive the second pulse signal $\overline{Q}_{X4}$ and an output terminal configured to output the PWM dimming signal $PWM_{(X+1)}$.

Herein in the present disclosure, a positive pulse refers to a high-logic level pulse, while a negative pulse refers to a low-logic level pulse.

Figure 7:
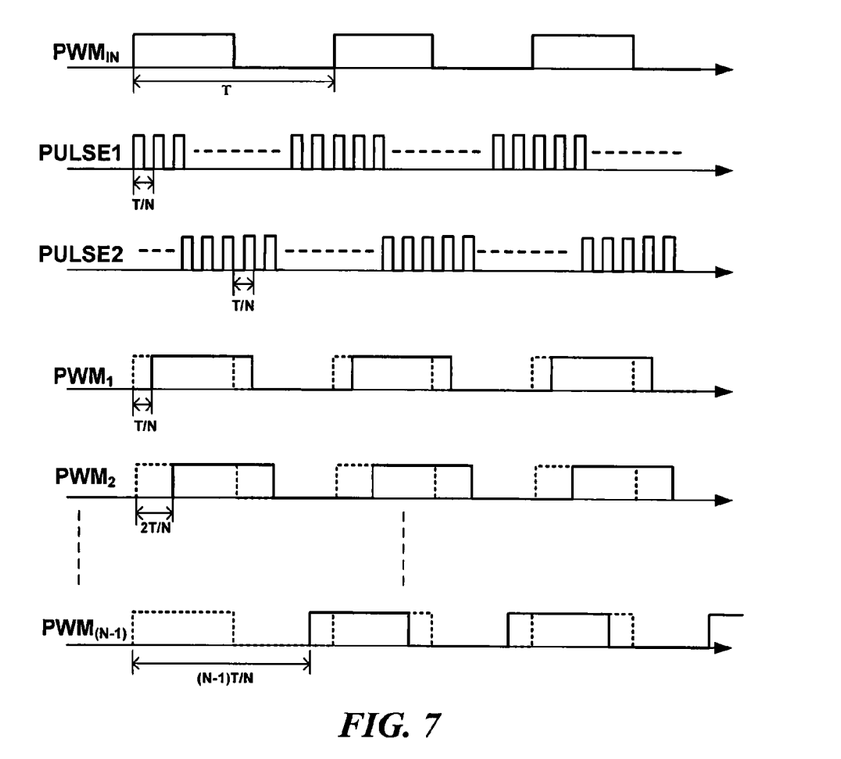
FIG. 7 illustrates schematically a wave-form diagram of the PWM input signal $PWM_{IN}$, the first sequence pulse signal $PULSE_1$, the second sequence pulse signal $PULSE_2$ and the PWM dimming signals $PWM_1$ to $PWM_N$ of FIG. 6.

FIG. 7 illustrates schematically a wave-form diagram of the PWM input signal $PWM_{IN}$, the first sequence pulse signal $PULSE_1$, the second sequence pulse signal $PULSE_2$ and the PWM dimming signals $PWM_1$ to $PWM_N$. The PWM input signal $PWM_{IN}$ is directly output as the PWM dimming signal $PWM_1$. The PWM dimming signals $PWM_2 \sim PWM_N$ are resulted from the PWM input signal $PWM_{IN}$ respectively delayed by T/N, 2T/N, (N−1)T/N.

From the foregoing, it will be appreciated that specific embodiments of the technology have been described herein for purposes of illustration, but that various modifications may be made without deviating from the disclosure. Many of the elements of one embodiment may be combined with other embodiments in addition to or in lieu of the elements of the other embodiments. Accordingly, the disclosure is not limited except as by the appended claims.

We claim:

1. A light emitting element driving circuit, comprising:
   a power conversion circuit having a power conversion input terminal configured to receive a power supply voltage, and having a power conversion output terminal configured to provide an output voltage for driving a plurality of parallel connected light emitting elements, wherein the power conversion circuit is configured to convert the power supply voltage into the output voltage;
   a plurality of light emitting elements, wherein each light emitting element having a first terminal and a second terminal, and wherein the output voltage is applied to the first terminal of each light emitting element; and
   a current balancing circuit coupled to the second terminal of each light emitting element, wherein the current balancing circuit is configured to provide a driving current to each light emitting element, and wherein the current balancing circuit is further configured to receive a first reference voltage, and based on the first reference voltage, the current balancing circuit is configured to regulate the driving currents flowing through the plurality of light emitting elements such that each driving current flowing through each of the plurality of light emitting elements is substantially similar; and
   wherein the current balancing circuit comprises:
      a reference voltage generating unit configured to receive the first reference voltage, and to generate a first reference current based on the first reference voltage, and wherein based on the first reference current, the reference voltage generating unit is configured to generate a plurality of second reference voltages; and
      a current regulating unit configured to receive the plurality of second reference voltages, to detect the plurality of driving currents flowing through the plurality of light emitting elements and to provide a plurality of feedback voltages respectively representing the plurality of driving currents, and to compare each feedback voltage with one of the plurality of second reference voltages to regulate the driving current corresponding to the feedback voltage via negative feedback regulation.

2. The light emitting element driving circuit of claim 1, wherein the reference voltage generating unit comprises:
   a current reference circuit having a first input terminal, a second input terminal and an output terminal, wherein the first input terminal is configured to receive the first reference voltage, the second input terminal is coupled to a peripheral electrical element, and wherein the current reference circuit is configured to generate the first reference current at the output terminal based on the first reference voltage and the peripheral electrical element;
   a current mirror circuit having an input terminal and a plurality of output terminals, wherein the input terminal is configured to receive the first reference current, and wherein the current mirror circuit is configured to output a plurality of second reference currents mirroring the first reference current with a same ratio at respectively the plurality of output terminals; and
   a voltage reference circuit having a plurality of input terminals and a plurality of output terminals, wherein the plurality of input terminals are configured to respectively receive the plurality of second reference currents and the plurality of output terminals are configured to respectively output the plurality of second reference voltages, and wherein the voltage reference circuit is configured to convert the plurality of second reference currents into the plurality of second reference voltages.

3. The light emitting element driving circuit of claim 2, wherein the current reference circuit comprises:
   a first operational amplifier having a first input terminal, a second input terminal and an output terminal, wherein the first input terminal is configured to receive the first reference voltage and the second input terminal is coupled to the peripheral electrical element; and
   a first controllable current source having a first current terminal, a second current terminal and a control terminal, wherein the first current terminal is coupled to the second input terminal of the first operational amplifier, the control terminal is coupled to the output terminal of the first operational amplifier and the second current terminal is configured to output the first reference current.

4. The light emitting element driving circuit of claim 2, wherein the current mirror circuit comprises a plurality of sub current mirror circuits coupled in parallel, wherein the plurality of sub current mirror circuits have a common input terminal configured to receive the first reference current, and each has an output terminal configured to output the second reference current.

5. The light emitting element driving circuit of claim 2, wherein the voltage reference circuit comprises a plurality of resistors of a same resistance, wherein each resistor has a first terminal configured to receive one of the plurality of second reference currents and a second terminal connected to ground, and wherein the plurality of second reference voltages $V_{ref2}$ are respectively generated at the first terminal of the plurality of resistors.

6. The light emitting element driving circuit of claim 1, wherein the current regulating unit comprises a plurality of current regulators, and wherein each current regulator comprises:
   a second operational amplifier having a first input terminal, a second input terminal and an output terminal, wherein the first input terminal is configured to receive one of the plurality of second reference voltages;
   a second controllable current source having a first current terminal, a second current terminal and a control terminal, wherein the first current terminal is coupled to one of the plurality of light emitting elements at the second terminal of the corresponding light emitting element to provide a driving current flowing through the corresponding light emitting element, the control terminal is coupled to the output terminal of the second operational amplifier; and a current sensing circuit having an input terminal and an output terminal, wherein the input terminal is coupled to the second current terminal of the second controllable current source for detecting the driving current flowing through the corresponding light emitting element, and the output terminal is configured to provide a feedback voltage representing the driving current flowing through the corresponding light emitting element to the second input terminal of the second operational amplifier.

7. The light emitting element driving circuit of claim 1 further comprising:

a first feedback circuit having a plurality of input terminals and an output terminal, wherein the plurality of input terminals are respectively configured to monitor the voltages at the second terminals of the plurality of light emitting elements, and the output terminal is configured to provide a first feedback signal representing a minimum voltage among the voltages at the second terminals of the light emitting elements, and wherein the first feedback signal is fed to the power conversion circuit and compared with a third reference voltage to provide an amplified error signal, and wherein the power conversion circuit regulates the output voltage at the power conversion output terminal based on the amplified error signal.

8. The light emitting element driving circuit of claim 1 further comprising:

a second feedback circuit having an input terminal coupled to the power conversion output terminal to receive the output voltage, and an output terminal configured to provide a second feedback signal representing the output voltage; and an over-voltage detection circuit comprising a first input terminal configured to receive the second feedback signal, a second input terminal configured to receive an over-voltage threshold, and an output terminal configured to output an over-voltage indication signal based on the second feedback signal and the over-voltage threshold, wherein the over-voltage indication signal has an over-voltage logic state representing an over-voltage condition at the power conversion output terminal and a normal logic state representing a normal condition at the power conversion output terminal, and wherein the over-voltage indication signal is at the over-voltage logic state when the second feedback signal is higher than the over-voltage threshold, and wherein the over-voltage indication signal is at the normal logic state when the second feedback signal is lower than the over-voltage threshold.

9. The light emitting element driving circuit of claim 8 further comprising a plurality of light emitting element protection circuits respectively coupled to the plurality of light emitting elements, wherein each light emitting element protection circuit comprises:

an open circuit detection comparator having a first input terminal configured to receive the voltage at the second terminal of the corresponding light emitting element, a second input terminal configured to receive an open circuit threshold, and an output terminal configured to output an open circuit indication signal based on a comparison result between the voltage at the second terminal of the corresponding light emitting element and the open circuit threshold; wherein the open circuit indication signal has an open circuit logic state representing an open circuit condition of the corresponding light emitting element, and a normal logic state representing a normal condition of the corresponding light emitting element; and wherein the open circuit indication signal is at the open circuit logic state when the voltage at the second terminal of the corresponding light emitting element is lower than the open circuit threshold; and wherein the open circuit indication signal is at the normal logic state when the voltage at the second terminal of the corresponding light emitting element is higher than the open circuit threshold;

a short circuit detection comparator having a first input terminal configured to receive the voltage at the second terminal of the corresponding light emitting element, a second input terminal configured to receive a short circuit threshold, and an output terminal configured to output a short circuit indication signal based on a comparison result between the voltage at the second terminal of the corresponding light emitting element and the short circuit threshold; wherein the short circuit indication signal has a short circuit logic state representing a short circuit condition of the corresponding light emitting element, and a normal logic state representing a normal condition of the corresponding light emitting element; and wherein the short circuit indication signal is at the short circuit logic state when the voltage at the second terminal of the corresponding light emitting element is higher than the short circuit threshold; and wherein the short circuit indication signal is at the normal logic state when the voltage at the second terminal of the corresponding light emitting element is lower than the short circuit threshold; and a trigger circuit having a first input terminal configured to receive the over-voltage indication signal, a second input terminal configured to receive the open circuit indication signal, a third input terminal configured to receive the short circuit indication signal, and an output terminal configured to output a first trigger signal having a trigger logic state and a normal logic state; wherein the first trigger signal is at the trigger logic state when the open circuit indication signal is at the open circuit logic state and the over-voltage indication signal is at the over-voltage logic state or when the short circuit indication signal is at the short circuit logic state for a duration longer than a predetermined duration threshold, else the first trigger signal is at the normal logic state.

10. The light emitting element driving circuit of claim 9, wherein the trigger circuit comprises:

a first logic circuit having a first input terminal configured to receive the over-voltage indication signal, a second input terminal configured to receive the open circuit indication signal, and an output terminal configured to output a first intermediate trigger signal having a trigger logic state and a normal logic state, and wherein the first intermediate trigger signal is at the trigger logic state when the open circuit indication signal is at the open circuit logic state and the over-voltage indication signal is at the over-voltage logic state, else the first intermediate trigger signal is at the normal logic state;

a timer having the predetermined duration threshold, comprising an input terminal configured to receive the short circuit indication signal, and an output terminal configured to output a second intermediate trigger signal having a trigger logic state and a normal logic state, wherein when the short circuit indication signal changes to the short circuit logic state, the timer is triggered to time a duration of the short circuit logic state of the short circuit indication signal, and wherein the second intermediate trigger signal is at the trigger logic state when the duration of the short circuit logic state exceeds the predetermined duration threshold, and wherein the second intermediate trigger signal is at the normal logic state when the short circuit indication signal is at the normal logic state or when the duration of the short circuit logic state is below the predetermined duration threshold; and a second logic circuit having a first input terminal configured to receive the first intermediate trigger signal, a second input terminal configured to receive the second intermediate trigger signal, and an output terminal configured to output the first trigger signal, wherein the first trigger signal is at the trigger logic state when at least one of the first intermediate trigger signal and the second intermediate trigger signal is at the trigger logic state, and wherein the first trigger signal is at the normal logic state when both the first intermediate trigger signal and the second intermediate trigger signal are at the normal logic state.

11. The light emitting element driving circuit of claim 10 further comprising a system shut-down trigger circuit, wherein the system shut-down trigger circuit is configured to receive all of the first trigger signals from the plurality of light emitting element protection circuits, and to provide a second trigger signal having a trigger logic state and a normal logic state based on all the first trigger signals, and wherein the second trigger signal is at the trigger logic state when all the first trigger signals are at the trigger logic states, and wherein the second trigger signal is at the normal logic state when at least one of the first trigger signals is at the normal logic state, and wherein the second trigger signal is configured to shut down the light emitting element driving circuit when the second trigger signal is at the trigger logic state.

12. The light emitting element driving circuit of claim 11 further comprising a status indication circuit, wherein the status indication circuit comprises:

a first input terminal configured to receive the over-voltage indication signal;

a second input terminal configured to receive the under-voltage indication signal;

a third input terminal configured to receive the second trigger signal; and an output terminal configured to output a status indication signal having a fault logic state representing a fault condition of the light emitting element driving circuit and a normal logic state representing a normal condition of the light emitting element driving circuit, and wherein the status indication signal is at the fault logic state when the over-voltage indication signal is at the over-voltage logic state or the under-voltage indication signal is at the under-voltage logic state or the second trigger signal is at the trigger logic state, else the status indication signal is at the normal logic state.

13. The light emitting element driving circuit of claim 1 further comprising:

a second feedback circuit having an input terminal coupled to the power conversion output terminal to receive the output voltage, and an output terminal configured to provide a second feedback signal representing the output voltage; and an under-voltage detection circuit comprising a first input terminal configured to receive the second feedback signal; a second input terminal configured to receive an under-voltage threshold; and an output terminal configured to output an under-voltage indication signal based on the second feedback signal and the under-voltage threshold, wherein the under-voltage indication signal has an under-voltage logic state representing an under-voltage condition at the power conversion output terminal and a normal logic state representing a normal condition at the power conversion output terminal, and wherein the under-voltage indication signal is at the under-voltage logic state when the second feedback signal is lower than the under-voltage threshold, and wherein the under-voltage indication signal is at the normal logic state when the second feedback signal is higher than the under-voltage threshold.

14. The light emitting element driving circuit of claim 1 further comprising a phase-shift PWM dimming circuit, wherein the phase-shift PWM dimming circuit comprises:

an input terminal configured to receive a PWM input signal having a cycle and a frequency; and a plurality of output terminals configured to output a plurality of PWM dimming signals, wherein the plurality of PWM dimming signals are configured to respectively regulate the plurality of driving currents through the plurality of light emitting elements so that the plurality of driving currents are pulse width modulated and the plurality of light emitting elements are illuminated/distinguished periodically, and wherein the PWM dimming signals for successively illuminating/distinguishing two of the light emitting elements have a predetermined phase difference.

15. The light emitting element driving circuit of claim 14, wherein the plurality of light emitting elements comprise N light emitting elements, the plurality of PWM dimming signals comprise N PWM dimming signals indexed from 1 to N, the predetermined phase difference is $2\pi/N$, and wherein N is an integer larger than 1, and wherein the phase-shift PWM dimming circuit comprises (N−1) delay circuits indexed from 1 to (N−1), wherein each delay circuit is configured to receive the PWM input signal, and wherein the delay circuit indexed by X is configured to delay the PWM input signal for (X−1)N times of the cycle of the PWM input signal to generate the PWM dimming signal indexed by (X+1), wherein X changes from 1 to (N−1), and wherein the PWM input signal is directly output as the PWM dimming signal indexed by 1.

16. The light emitting element driving circuit of claim 14, wherein the plurality of light emitting elements comprise N light emitting elements, the plurality of PWM dimming signals comprise N PWM dimming signals indexed from 1 to N, the predetermined phase difference is $2\pi/N$, and wherein N is an integer larger than 1, and wherein the phase-shift PWM dimming circuit comprises:

a frequency multiplier module configured to receive the PWM input signal, and to generate a first sequence pulse signal and a second sequence pulse signal, wherein the first sequence pulse signal is generated by multiplying the frequency of the PWM input signal by N times at each rising edge of the PWM input signal, and wherein the second sequence pulse signal is generated by multiplying the frequency of the PWM input signal by N times at each falling edge of the PWM input signal; and a delay module configured to receive the first sequence pulse signal and the second sequence pulse signal, and to generate the PWM dimming signals indexed from 2 to N based on counting the pulses of the first sequence pulse signal and the second sequence pulse signal, wherein the delay module is configured to generate the rising edge of the PWM dimming signals indexed by X when X pluses of the first sequence pulse signal are counted, and wherein the delay module is further configured to generate the falling edge of the PWM dimming signal indexed by X when X pulses of the second sequence pulse signal is counted, and X changes from 2 to N, and wherein the PWM input signal is directly output as the PWM dimming signal indexed by 1.

17. The light emitting element driving circuit of claim 16, wherein the frequency multiplier module comprises:

a first frequency multiplier circuit configured to receive the PWM input signal and to generate the first sequence pulse signal, wherein the first frequency multiplier circuit is triggered to multiply the frequency of the PWM input signal $PWM_{IN}$ by N times at each rising edge of the PWM input signal; and a second frequency multiplier circuit configured to receive the PWM input signal and to generate the second sequence pulse signal, wherein the second frequency multiplier circuit is triggered to multiply the frequency of the PWM input signal by N times at each falling edge of the PWM input signal.

18. The light emitting element driving circuit of claim 16, wherein the delay module comprises N−1 delay circuits indexed from 1 to N−1, and wherein each delay circuit is configured to receive the PWM input signal, the first sequence pulse signal and the second sequence pulse signal, and wherein the delay circuits indexed from 1 to N−1 are respectively configured to output the PWM dimming signals indexed from 2 to N, and wherein the delay circuits indexed from 1 to N−1 are respectively triggered to count the positive pulses of the first sequence pulse signal at each rising edge of the PWM input signal to respectively generate a rising edge for the PWM dimming signals indexed from 2 to N when 2 to N positive pulses are counted, and wherein the delay circuits indexed from 1 to N−1 are respectively triggered to count the negative pulses of the second sequence pulse signal at each falling edge of the PWM input signal to respectively generate a falling edge for the PWM dimming signals indexed from 2 to N when 2 to N negative pulses are counted.

19. The light emitting element driving circuit of claim 18, wherein the delay circuit indexed by X comprises:

a positive pulse counter having an enable terminal, a counting input terminal, a reset terminal and an output terminal, wherein the enable terminal is configured to receive the PWM input signal, the counting input terminal is configured to receive the first sequence pulse signal, the output terminal is configured to output a first pulse signal based on the PWM input signal and the first sequence pulse signal, and the reset terminal is configured to receive the first pulse signal, and wherein the positive pulse counter is trigged to count the positive pulses of the first sequence pulse signal when each rising edge of the PWM input signal comes at the enable terminal, and wherein the positive pulse counter is configured to output the first pulse signal when (X+1) positive pulses are counted, and wherein the first pulse signal resets the positive pulse counter;

a negative pulse counter having an enable terminal, a counting input terminal, a reset terminal and an output terminal, wherein the enable terminal is configured to receive the PWM input signal, the counting input terminal is configured to receive the second sequence pulse signal, the output terminal is configured to output a second pulse signal based on the PWM input signal and the second sequence pulse signal, and the reset terminal is configured to receive the second pulse signal, and wherein the negative pulse counter is trigged to count the negative pulses of the second sequence pulse signal when each falling edge of the PWM input signal comes at the enable terminal, and wherein the negative pulse counter is configured to output the second pulse signal when (X+1) negative pulses are counted, and wherein the second pulse signal resets the negative pulse counter; and a flip-flop having a set terminal configured to receive the first pulse signal, a reset terminal configured to receive the second pulse signal and an output terminal configured to output the PWM dimming signal indexed by (X+1); and wherein X changes from 1 to N−1.

* * * * *